(12) United States Patent
Rolland

(10) Patent No.: US 7,013,794 B2
(45) Date of Patent: Mar. 21, 2006

(54) ELECTRIC COFFEE MAKER WITH PIVOTING WATER RESERVOIR

(75) Inventor: Jacky Rolland, Saint Martin de Fontenay (FR)

(73) Assignee: SEB S.A., Ecully Cedex (FR)

( * ) Notice: Subject to any disclaimer, the term of this patent is extended or adjusted under 35 U.S.C. 154(b) by 534 days.

(21) Appl. No.: 10/239,643

(22) PCT Filed: Mar. 22, 2001

(86) PCT No.: PCT/FR01/00863

§ 371 (c)(1),
(2), (4) Date: Sep. 24, 2002

(87) PCT Pub. No.: WO01/72189

PCT Pub. Date: Oct. 4, 2001

(65) Prior Publication Data

US 2003/0037680 A1  Feb. 27, 2003

(30) Foreign Application Priority Data

Mar. 24, 2000 (FR) .................................. 00 04179

(51) Int. Cl.
*A47J 31/00* (2006.01)

(52) U.S. Cl. ........................... 99/284; 99/300; 99/307; 99/279

(58) Field of Classification Search .................. 99/284, 99/300, 306, 304, 307, 279
See application file for complete search history.

(56) References Cited

U.S. PATENT DOCUMENTS

| 3,187,663 A | * | 6/1965 | Mclean, Jr. et al. | .......... 99/305 |
| 4,155,292 A | * | 5/1979 | Rickert | ........................ 99/306 |
| 4,555,984 A | * | 12/1985 | Yamashita | ................... 99/286 |

FOREIGN PATENT DOCUMENTS

| DE | 195 04 839 C1 | 4/1996 |
| EP | 0 404 688 A1 | 12/1990 |

* cited by examiner

*Primary Examiner*—Reginald L. Alexander
(74) *Attorney, Agent, or Firm*—Young & Thompson

(57) ABSTRACT

Electric coffee maker includes a housing (1) comprising a base (5) on which rests a support (3) for an infusion receptacle (5), an upright (4) secured to the base (2) enclosing an infusion group and carrying at its upper region an infusion head (6) overlying the support, and a water reservoir (7) formed by a tubular body comprising a base (8) and a sidewall (9) and adapted to supply the infusion group. The water reservoir (7) is pivotally mounted on the base about a vertical axis (X–X') to occupy at least one closed position and at least one extended position.

14 Claims, 3 Drawing Sheets

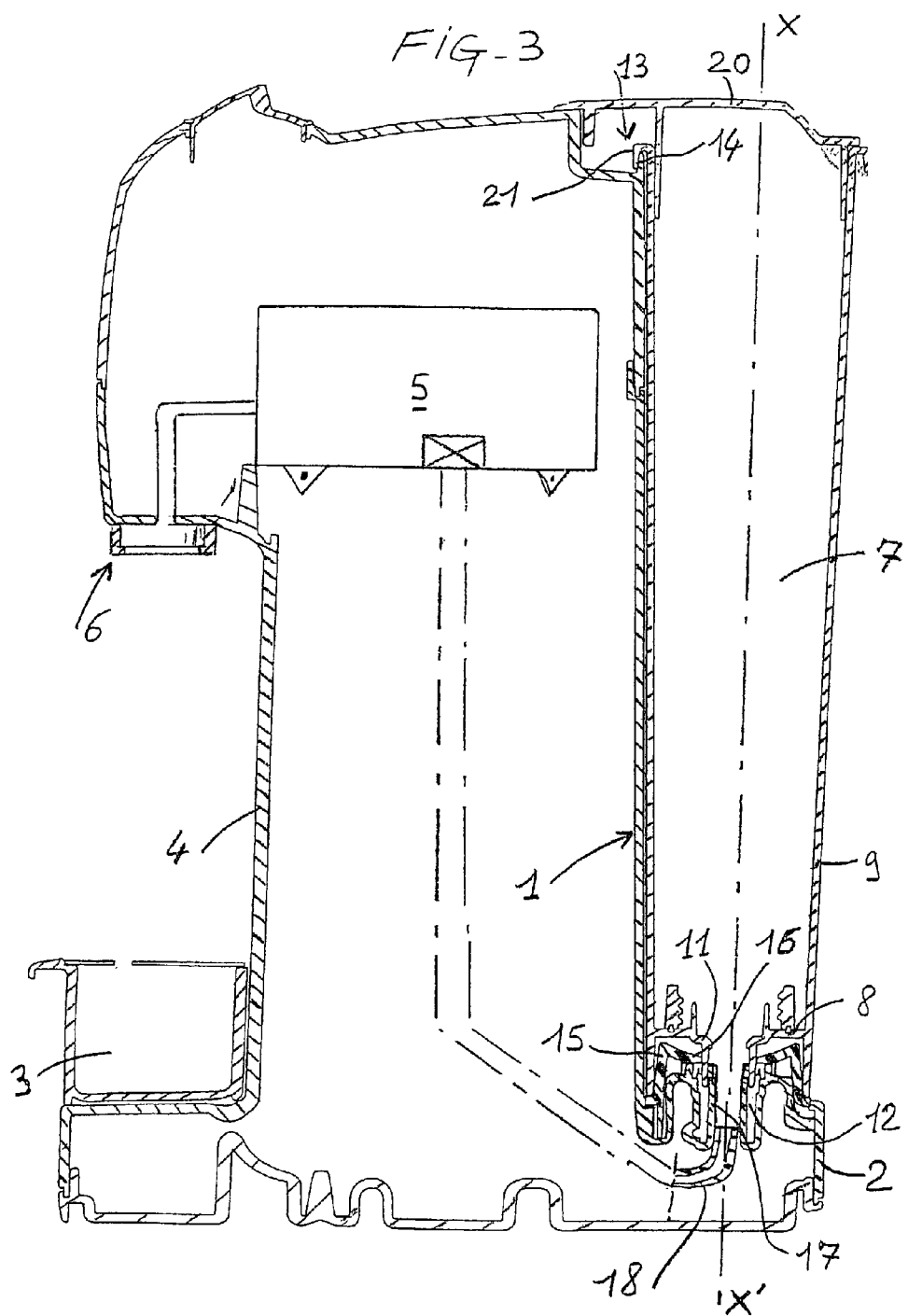

ELECTRIC COFFEE MAKER WITH PIVOTING WATER RESERVOIR

CROSS REFERENCE TO RELATED APPLICATION

This is the 35 USC 371 national stage of international application PCT/FR01/00863 filed on Mar. 22, 2001, which designated the United States of America.

FIELD OF THE INVENTION

The present invention relates to an electric coffee maker comprising a housing having a base on which rests a support for an infusion receptacle, an upright secured to the base enclosing an infusion group and carrying at its upper region an infusion head overlying said support, and a water reservoir formed of a tubular body comprising a bottom and a side wall and adapted to supply said infusion group.

BACKGROUND OF THE INVENTION

In machines known until now, the water reservoir is mounted in a position adjacent the upright and/or the infusion head and hence can give rise, during its filling, to spilling or undesirable pouring adapted to leak into the housing and come into contact with the electric components. Moreover, these overflows soil the surface condition of the housing.

To overcome these major drawbacks, manufacturers have made removable water reservoirs thereby permitting the user to fill them outside the housing. However, such reservoirs must be carefully returned to position and give rise to valves and connections of the self-sealing type whose reliability declines as a result of too many uses. Moreover, the problem of filling these reservoirs in the course of operation is not solved and gives rise to the problem stated above.

SUMMARY OF THE INVENTION

The invention thus has for its object to overcome the mentioned drawbacks whilst giving the user a simple and safe handling of the reservoir, and providing a simple construction that is nevertheless reliable.

According to the invention, the water reservoir is mounted pivotably on the housing about a vertical axis (X–X') to occupy at least one closed position and at least one extended position.

The user can thus cause the water reservoir to pass from its stored position to its extended position for filling, by simple pivotal movement imparted to the reservoir, and vice versa.

According to another characteristic of the invention, the bottom of the reservoir comprises an outlet nozzle which is adapted to be connected to said infusion group and which forms a lower pivot for the reservoir.

Thanks to this construction, it will be understood that the connection is subjected principally to a rotation movement with a small angular movement that does not thereby give rise to substantial wear and guaranteeing good sealing over time.

BRIEF DESCRIPTION OF THE DRAWINGS

The characteristics and advantages of the invention will become apparent from the description which follows, given by way of non-limiting example, with reference to the accompanying drawings, in which:

FIG. 3 is a vertical cross-section on an enlarged scale on the line III—III of FIG. 1.

DETAILED DESCRIPTION OF THE INVENTION

Figure 1:
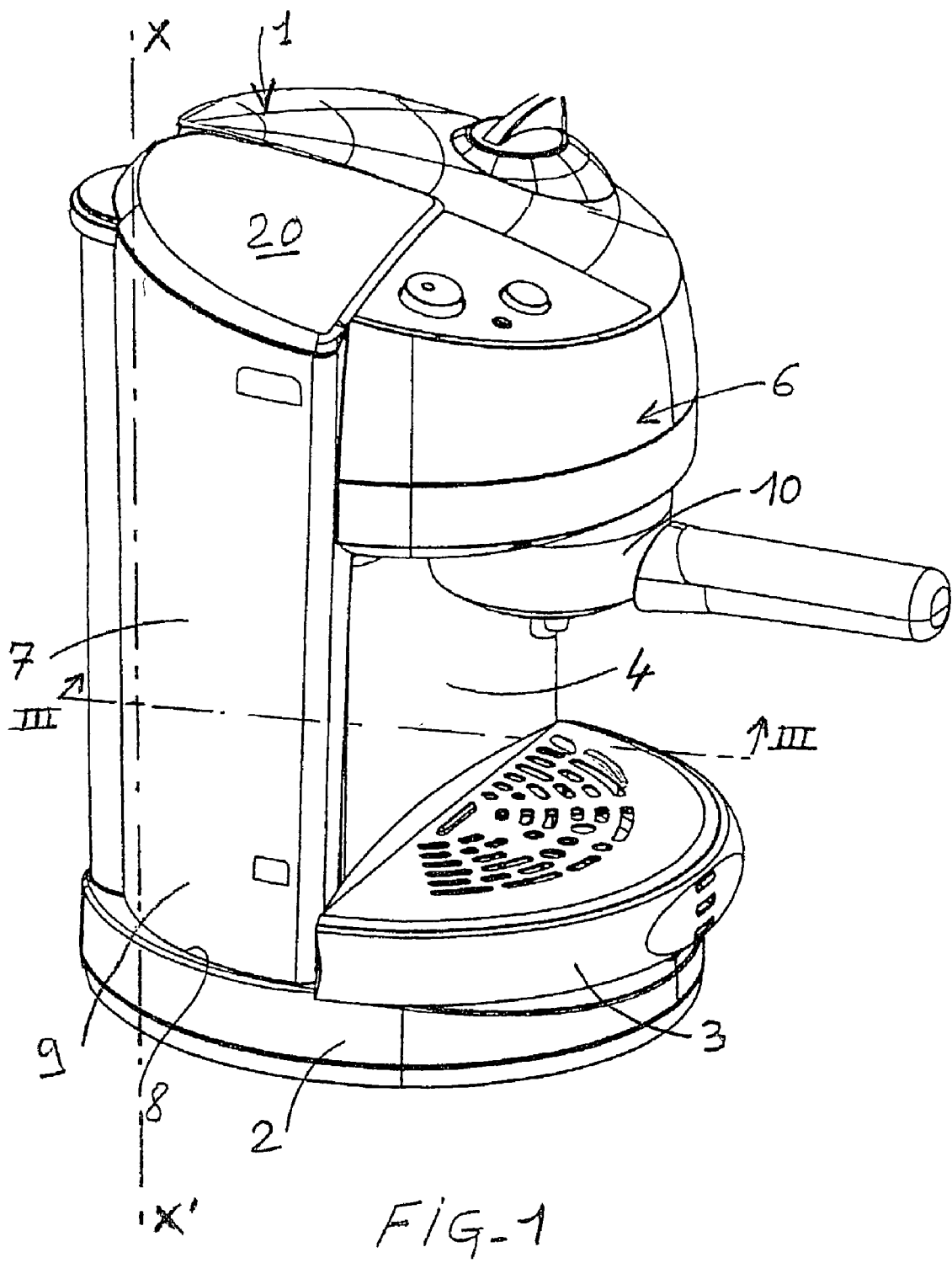
FIG. 1 is a perspective view of a coffee maker according to the invention, showing a reservoir provided with a cover, in the closed position.

The electric coffee maker shown in FIG. 1 comprises a housing 1 comprising a base 2 on which rests a support 3 for an infusion receptacle (not shown), an upright 4 secured to the base enclosing an infusion group schematically shown at 5 (FIG. 3) and carrying at its upper region an infusion head 6 overlying said support 3, and a cold water reservoir 7 formed of a tubular body comprising a bottom 8 and a sidewall 9. The reservoir 7 is adapted to supply the infusion group 5.

In the illustrated embodiment, the reservoir 7 is mounted in a coffee maker of the espresso type which comprises, as is known, a pump connected to the cold water reservoir and adapted to supply under pressure a water heater, itself connected to the infusion head 6, which is provided with a cup 10 containing a dose of coffee.

Of course, the coffee machine can be of the "drip" type, the infusion head in this case carrying a filter adapted to receive ground coffee.

Figure 2:
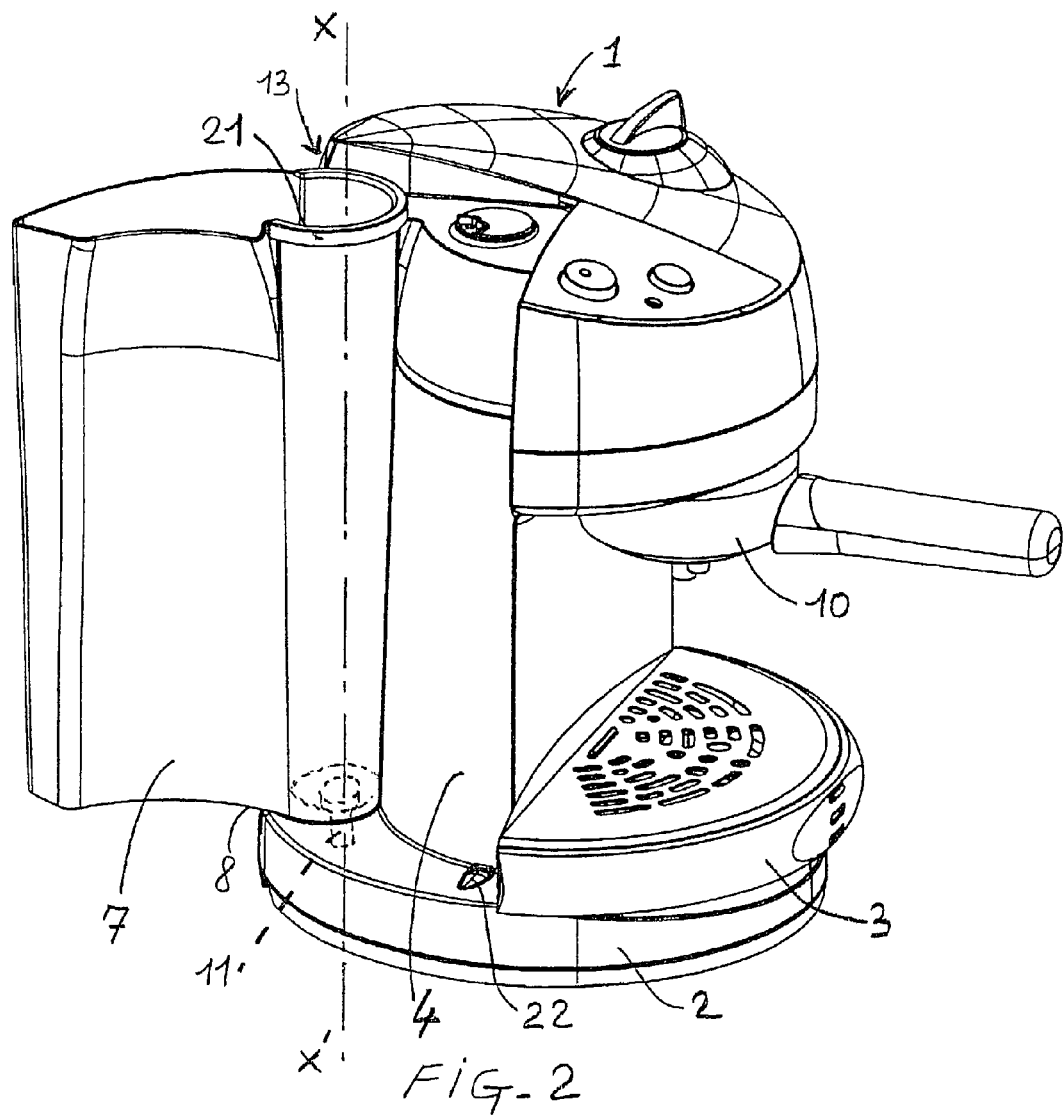
FIG. 2 is a view similar to FIG. 1 showing the water reservoir in an extended position and without the cover.

According to the invention, the water reservoir 7 is pivotally mounted on the housing 1 about a vertical axis indicated at X–X' to occupy at least one closed use position (FIGS. 1 and 3) and an extended or filling position (FIG. 2).

In a preferred embodiment and as seen in FIG. 3, the bottom 8 of the reservoir comprises a water outlet nozzle 11 which is adapted to be connected to said infusion group 5 and which forms a lower pivot for the reservoir 7. The lower pivot 11 thus constituted is mounted in a bore 12 provided in the base 2. To ensure better stability of pivoting about the axis X–X', the water reservoir 7 has an upper pivot 13 which engages with a bearing 14 secured to the upright 4.

According to another important characteristic of the invention, the water reservoir 7 is removably mounted on the base 2.

Preferably, to carry out reliably and simply such a removal, the bore comprises an annular joint 15 with a flexible lip 16 which will surround the nozzle 11 in a sealed manner, as well as a connector 17 connected to tubing 18, itself connected to the infusion group 5, whilst the bearing 14 is formed by a curve projection disposed vertically and on which the upper pivot 13 will engage, which has a hook 21 which comes into engagement with said projection. This projection-bearing extends vertically along an arc of a circle to limit the swinging of the reservoir 7.

Preferably, as shown in FIGS. 1 and 2, the base 2 has the general shape of a flat cylinder on which rests the forward portion of the support 3 forming a vessel for infusion residues and having a semi-cylindrical shape, and at its rear surface the upright 4 and the water reservoir 7. To permit aesthetic integration of the reservoir and to ensure good stability of the machine in the course of filling said reservoir, the base 8 of this latter has the shape of a crescent moon (see FIGS. 1 and 2) and the sidewall 9 has an external surface which in the closed position is comprised within the volume defined by the base.

So as to carry out maximum extension of the reservoir 7 outside the base of the housing 1, said reservoir extends along the upright and the vertical pivotal axis X–X' is substantially arranged in the peripheral region of the base 2. This extension thus permits easy filling of the reservoir without the risk of soiling the housing 1.

The operation of such a water reservoir is as follows. Supposing that the water reservoir 7 occupies its closed position shown particularly in FIG. 1, the user removes a protective cover 20 closing the reservoir and by the upper edge of the reservoir (or by a handle not shown) causes it to pivot about its vertical axis thereby causing the hook 20 to slide on the projection 14 and the base 11 to turn in the annular joint 15, to come to the extended position shown in FIG. 2. In this position, the user has the choice between directly filling the reservoir, or removing this reservoir by pulling upwardly so as to uncouple the nozzle 11 from the joint 15 and the hook 21 from the projection 14, so as to permit its filling under a faucet.

Once the filling operation is completed and the reservoir correctly positioned, the user causes it to pivot in the opposite direction to bring it to its closed position; and it can be locked in this position automatically by any known snap-in means such as, for example, a projection 22 formed in the base 2 and adapted to come into engagement with the bottom 8 of the reservoir 7 (FIG. 2).

What is claimed is:

1. Electric coffee maker comprising:
    a housing comprising a base on which rests a support;
    an upright secured to the base enclosing an infusion group and carrying at its upper region an infusion head overlying said support; and
    a water reservoir formed of a tubular body comprising a bottom and a sidewall and adapted to supply said infusion group;
    said water reservoir being mounted pivotally on the housing about a vertical axis to occupy at least one closed position and at least one extended position.

2. The electric coffee maker according to claim 1, wherein the bottom of the water reservoir comprises a water outlet nozzle which is adapted to be connected to said infusion group and which forms a lower pivot for the water reservoir.

3. The electric coffee maker according to claim 2, wherein the lower pivot is mounted in a bore provided in the base.

4. The electric coffee maker according to claim 1, wherein the water reservoir extends in the closed position along the upright, and the vertical axis is substantially arranged in a peripheral region of the base.

5. The electric coffee maker according to claim 1, wherein the water reservoir is removably mounted.

6. The electric coffee maker according to claim 1, wherein the base has the general shape of a flat cylinder, the bottom of the water reservoir has the shape of a crescent moon, and the side wall has an external surface, which in the closed position, is comprised within the volume defined by the base.

7. The electric coffee maker according to claim 1, wherein the water reservoir is mounted in an espresso coffee maker.

8. Electric coffee maker comprising:
    a housing comprising a base on which rests a support;
    an upright secured to the base enclosing an infusion group and carrying at its upper region an infusion head overlying said support; and
    a water reservoir formed of a tubular body comprising a bottom and a sidewall and adapted to supply said infusion group;
    said water reservoir being mounted pivotally on the housing about a vertical axis to occupy at least one closed position and at least one extended position;
    said water reservoir having an upper pivot which engages with a bearing secured to the upright.

9. The electric coffee maker according to claim 8, wherein the bottom of the water reservoir comprises a water outlet nozzle which is adapted to be connected to said infusion group and which forms a lower pivot for the water reservoir.

10. The electric coffee maker according to claim 9, wherein the lower pivot is mounted in a bore provided in the base.

11. The electric coffee maker according to claim 8, wherein the water reservoir extends in the closed position along the upright, and the vertical axis is substantially arranged in a peripheral region of the base.

12. The electric coffee maker according to claim 8, wherein the water reservoir is removably mounted.

13. The electric coffee maker according to claim 8, wherein the base has the general shape of a flat cylinder, the bottom of the water reservoir has the shape of a crescent moon, and the side wall has an external surface, which in the closed position, is comprised within the volume defined by the base.

14. The electric coffee maker according to claim 14, wherein the water reservoir is mounted in an espresso coffee maker.

\* \* \* \* \*